Patented Dec. 18, 1934

1,984,722

UNITED STATES PATENT OFFICE 1,984,722

AZO DYESTUFF CONTAINING A CHRYSENE NUCLEUS

Alfred Bergdolt, Cologne-on-the-Rhine, and Albert Schmelzer, Cologne-Mulheim-on-the-Rhine, Germany, assignors to General Aniline Works, Inc., New York, N. Y., a corporation of Delaware No Drawing. Application December 6, 1932, Serial No. 646,024. In Germany December 18, 1931

12 Claims. (Cl. 260—86)

The present invention relates to new water insoluble azo dyestuffs, more particularly it relates to azo dyestuffs which may be represented by the probable general formula

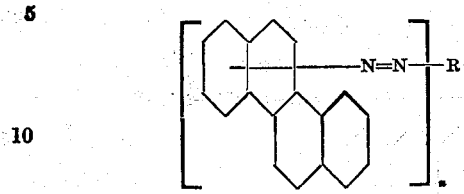

wherein $n$ stands for one of the numbers one and two, R stands for the radical of a coupling component suitable for producing an azo dyestuff free from a group inducing solubility in water, such as a sulfonic or carboxylic acid group; that means in the coupling component suitable for producing our new azo dyestuffs, there may be present substituents such as alkyl, alkoxy, halogen, the nitro group, a substituted amino group etc. As coupling components preferably used in our invention there may be mentioned by way of example o-hydroxy carboxylic acid arylamides of naphthalene or arylamides of hydroxy carboxylic acids of other aromatic ring systems, such as arylamides of 2-hydroxy-3-anthracene carboxylic acid, 2-hydroxy-carbazole-3-carboxylic acid, 2-hydroxy-α-benzocarbazole-3-carboxylic acid (see U. S. Patent 1,867,106) and the like, aceto-acetic acid arylamides and derivatives thereof, such as bis-(aceto-acetic acid arylamides).

Our new dyestuffs are obtainable by diazotizing in the usual manner aminochrysene and coupling in substance or on the fibre with a coupling component of the kind referred to above. The dyestuffs when produced on the fibre according to the known methods of producing ice colors generally yield blue to violet to brown shades of good fastness to boiling and chlorine.

The amino-chrysene used as diazotization component in our invention is obtainable by nitrating chrysene occurring in the high boiling fractions of coal tar and reducing the nitro compound to form the corresponding amino compound according to the direction given in Berichte der Deutschen Chemischen Gesellschaft, vol. 23, 1890, page 244 sequ. From our present knowledge we cannot definitely state at what position the nitro group enters the chrysene, and therefore the constitution of the amino chrysene used is not known.

The following example serves to illustrate the invention, without limiting it thereto:—

Example:—50 parts by weight of cotton yarn are treated in the usual manner with a solution containing in one litre 6 parts by weight of 2-hydroxy-naphthoylaminobenzene for half an hour at 30° C. The yarn is well squeezed and introduced for about half an hour into a diazo solution prepared in the usual manner from 2.45 parts by weight of amino-chrysene which bath has been neutralized by sodium bicarbonate and to which 20 parts by weight of zinc sulfate have been added. The yarn is then rinsed, soaped while boiling and dried. A bluish violet of excellent fastness to boiling and chlorine is thus obtained.

The dyestuff has the following formula:

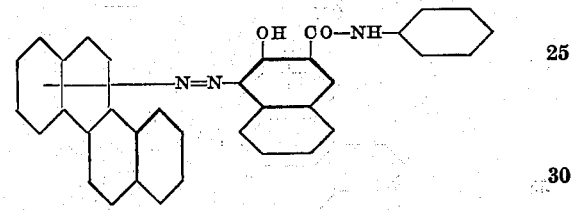

In an analogous manner the dyestuff from diazochrysene and 1-(2',3'-hydroxynaphthoylamino)-3-nitrobenzene of the formula.

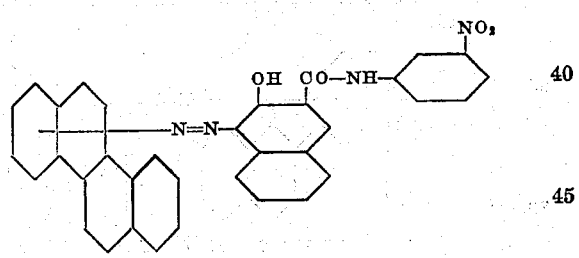

yields a navy blue of similar fastness properties; the dyestuff from diazochrysene and 1(2',3'-hydroxynaphthoylamino)-naphthalene of the formula

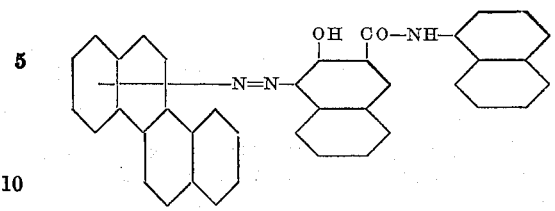

yields a reddish navy blue of the same fastness properties; the dyestuff from diazochrysene and 1 - (5' - hydroxy - 1,2,1',2' - benzocarbazole - 4' - carbonylamino) - 2 - methyl - 4 - methoxybenzene of the formula

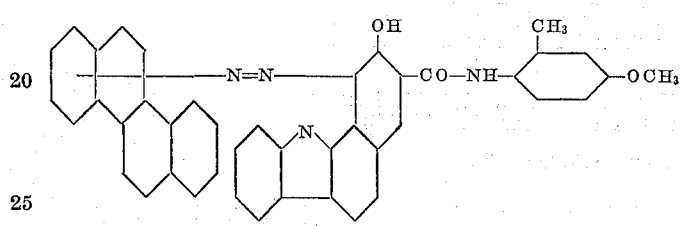

yields a dark blue of similar fastness properties; the dyestuff from diazochrysene and 4,4'-acetoacetylamino-3,3'-dimethyl-diphenyl of the formula

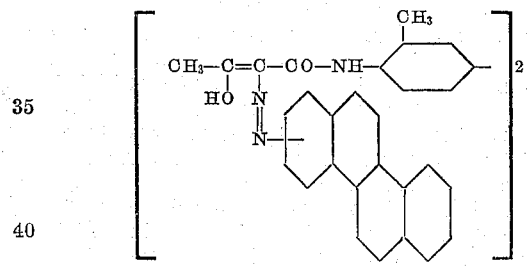

yields a yellowish brown of good fastness properties. The dyestuff from diazochrysene and acetoacetic acid anilide of the formula

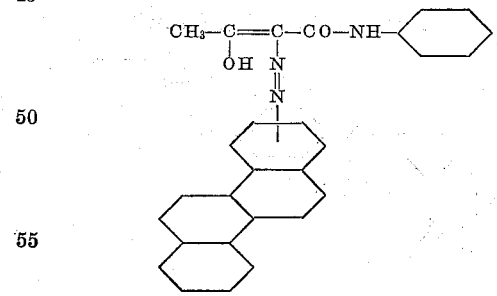

yields a yellowish-brown of good fastness properties.

We claim:

1. Water insoluble dyestuffs of the general formula

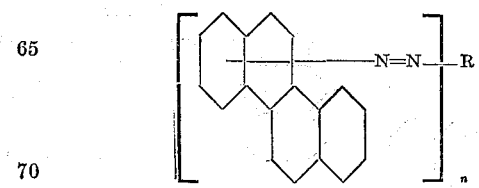

wherein $n$ stands for one of the numbers one and two and R stands for the radical of a coupling component suitable for producing an azo dyestuff free from a group inducing solubility in water, yielding when produced on the fibre generally blue to violet to brown shades of good fastness to boiling and chlorine.

2. Water insoluble dyestuffs of the formula

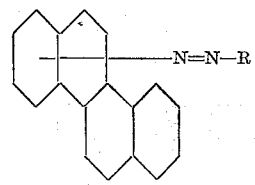

wherein R stands for the radical of a coupling component suitable for producing an azo dyestuff free from a group inducing solubility in water, yielding when produced on the fibre generally blue to violet to brown shades of good fastness to boiling and chlorine.

3. Water insoluble dyestuffs of the general formula

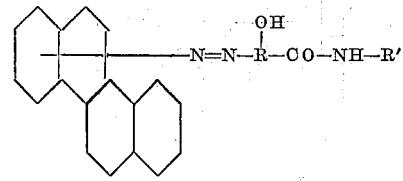

wherein R stands for a radical of the naphthalene or benzocarbazole series, R' stands for a radical of the benzene or naphthalene series, the OH group stands in ortho position to the group CO—NH—R and wherein R and R' may be substituted by substituents selected from the group consisting of alkoxy, alkyl, halogen and a nitro group, yielding when produced on the fibre generally blue to violet shades of good fastness to boiling and chlorine.

4. The dyestuff of the following formula:

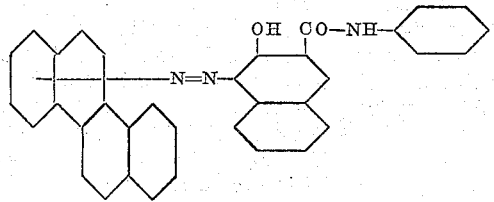

yielding when produced on the fibre a bluish violet of excellent fastness to boiling and chlorine.

5. The dyestuff of the following formula

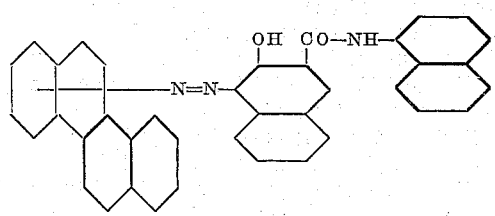

yielding when produced on the fibre a reddish navy blue of excellent fastness to boiling and chlorine.

6. The dyestuff of the following formula:

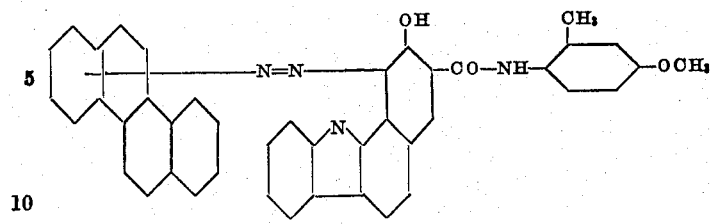

yielding when produced on the fibre a dark blue of excellent fastness to boiling and chlorine.

7. Fibres dyed with a dyestuff as claimed in claim 1.

8. Fibres dyed with a dyestuff as claimed in claim 2.

9. Fibres dyed with a dyestuff as claimed in claim 3.

10. Fibres dyed with a dyestuff as claimed in claim 4.

11. Fibres dyed with a dyestuff as claimed in claim 5.

12. Fibres dyed with a dyestuff as claimed in claim 6.

ALFRED BERGDOLT.
ALBERT SCHMELZER.